June 12, 1962 C. A. PARKER 3,038,581
COMBINED CARRIAGE CUSHION AND INTERLOCK
Filed Sept. 30, 1960 2 Sheets-Sheet 1

INVENTOR.
CHARLES A. PARKER
BY *Elmer W Edwards*
AGENT

June 12, 1962 C. A. PARKER 3,038,581
COMBINED CARRIAGE CUSHION AND INTERLOCK
Filed Sept. 30, 1960 2 Sheets-Sheet 2

INVENTOR.
CHARLES A. PARKER
BY
AGENT

# United States Patent Office 3,038,581
Patented June 12, 1962

3,038,581
COMBINED CARRIAGE CUSHION
AND INTERLOCK
Charles A. Parker, East Orange, N.J., assignor to Monroe Calculating Machine Company, Orange, N.J., a corporation of Delaware
Filed Sept. 30, 1960, Ser. No. 59,629
12 Claims. (Cl. 197—128)

The present invention relates to a combination frictional cushion and interlock device as pertains to a front feed apparatus of the kind which is adapted to bring a work sheet in proper line position for receiving printing impressions, and which is pivotally hinged upon the carriage of a bookkeeping or typewriting machine whereby to be manually tilted backward.

One such form handling device to which the present invention, for convenience, is herein shown as applied is that disclosed in United States Patent No. 2,831,560 issued April 22, 1958 to M. Oberholzer et al. and as modified by United States Patent No. 2,916,129 issued December 8, 1959 to the present inventor, to which reference is made for details of structure and operation of parts not herein deemed necessary to describe.

As set forth in said patents a form handling carriage is pivotally hinged on the usual shiftable record carriage of a printing machine and includes a front feed chute into which the operator inserts a work sheet. Thereupon the sheet is automatically fed downwardly to the proper line position for printing as controlled by suitable feed control designations or representations carried by the sheet. When the shiftable carriage is returned after printing, another feed control designation is applied to the sheet to govern the feeding thereof the next time it is to be used, and the sheet is automatically fed upwardly for either a single line spacing or for ejection. After posting is completed on the last line of the sheet and the record carriage returned, the sheet is automatically ejected upwardly.

So that a journal sheet, in the usual manner, may first be inserted upon the printing platen of the shiftable record carriage, the front feed carriage is hinged for pivotal movement upon the shiftable carriage in such manner as to permit a manual backward tilting thereof whereby to expose the printing platen, or to be readily removed and so be available for use on some other machine. Following an insertion of the journal sheet upon the record carriage platen the front feed carriage is thereafter manually tilted forwardly to its normal position and ready for a paper insertion.

In actual practice it has been found that operators tend to manually flip the front feed carriage to its alternate set positions in a vigorous manner and that due to the weight of the parts this will impart a considerable strain upon the record carriage and its supporting members and so is apt to effect damage thereto.

Also, in order to facilitate a quick and easy removal of the front feed carriage from the machine, the pivot hinge members which support the carriage each include a slotted open end portion and such vigorous manual operation of the carriage often will cause the cooperating halves of the hinge members to separate, in which case the carriage may fall free of the machine and sustain damage.

An object of the present invention therefore is to provide friction means for cushioning the manual rocking operations of a front feed carriage about its supporting hinge members.

Another object is to provide a friction cushion means adapted for controlling manual rotative operations of a front feed carriage about its supporting hinge members and which permit an easy and rapid removal of the carriage from the hinge bearing means.

Another object of the invention is the inclusion of locking means operable with the friction cushion means and which act to prevent inadvertent parting of the carriage supporting hinge elements during tilting operations of the front feed carriage.

A further object of the invention resides in the provision of means whereby the said locking means are adjustable with the said friction means and wherein a selected movement of the carriage serves to release the said locking means coincident with an adjustment of the hinge elements to an open condition for manually removing the carriage.

The above and other objects, features, and advantages of the present invention will be more fully understood from the following detailed description when considered in connection with the accompanying drawings in which.

Figure 1:
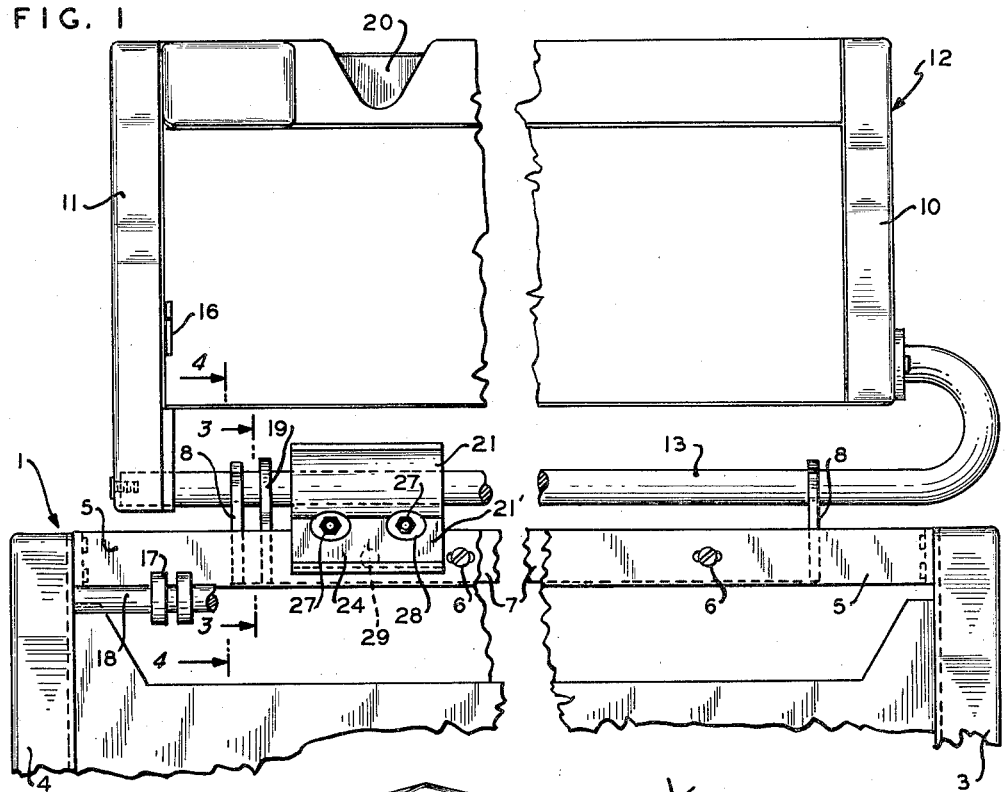
FIG. 1 shows the front feed carriage in a tilted-back position, the parts being viewed in the direction indicated by the arrows 1—1 of FIG. 2.
Figure 2:
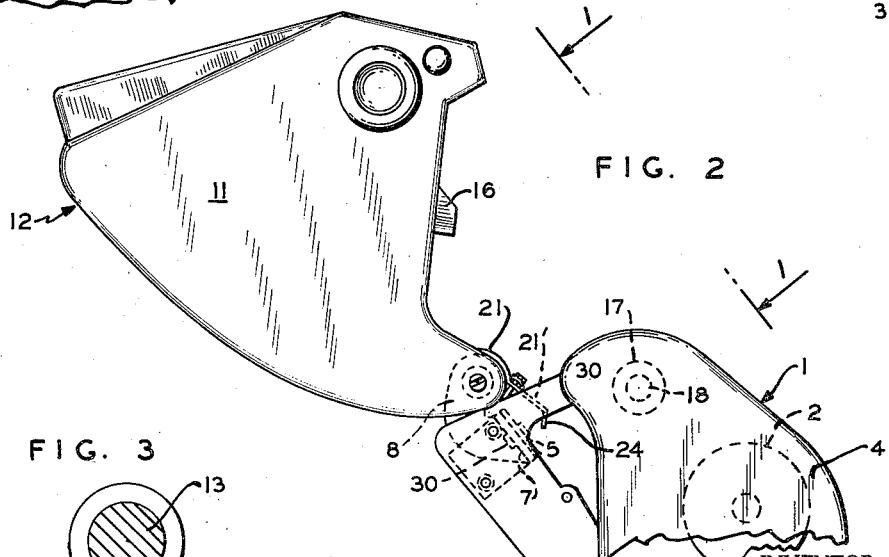
FIG. 2 is a fragmentary left side elevation of a shiftable platen carriage upon which the front feed carriage is pivotally hinged, the latter carriage being shown in a tilted-back position for permitting access to the printing platen.

Referring now to FIGS. 1 and 2, a record carriage 1 supports a printing platen 2 and is mounted in any suitable fashion on an accounting machine or the like, for example, as disclosed in U.S. Patent No. 2,809,782 issued October 15, 1957, to H. M. Fleming.

Within the right and left end frames 3, 4 of said carriage is supported a transverse frame 5 having secured thereto, through means of suitable screws 6, a bracket 7 the right and left ends of which are bent backward thereto, whereby to form a pair of upwardly extending arms 8. Each of the arms 8 is pierced to provide an orifice 9 therein which includes an open end slot 9'. Suitably secured to the right and left end plates 10, 11 respectively of a front feed carriage 12, of well-known structure, is a transversely extending hinge rod 13 for said carriage. Within the peripheral diameter of said rod there is cut two grooves which provide bearing surfaces 14 and side guide surfaces 15 for cooperation with the respective arms 8, whereby to form a pair of spaced hinges by which the front feed carriage is secured for pivotal movement upon the shiftable carriage 1. Said bearing surfaces 14 have cutaway portions to form diametrically opposed flat sides as shown, so as to permit the entry of hinge rod 13 through the corresponding slots 9' of the related hinge arms 8.

After rod 13 has been inserted within the hinge arms 8, the carriage is manually rocked forwardly until a locking plate 16 (FIG. 6) thereon is brought to rest upon a grooved guide sleeve 17 integral with a fixed rod 18 fast within the end plates 3, 4 of the platen carriage 1. During the said forward movement of carriage 12 bearing surfaces 14 of rod 13 will rotate clockwise therewith to the position shown in FIG. 6 and will thus lock the hinge rod 13 within the support arms 8, so that carriage 12 is now secured to the carriage 1.

Figure 3:
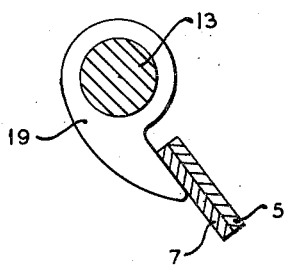
FIG. 3 is a detail cross section taken along line 3—3 of FIG. 1, showing a limit stop arm which serves to hold the front feed carriage in the tilted-back position.

In the general work for which machines of the above character are adapted a journal sheet is usually inserted upon the platen 2 of carriage 1 and to do this the operator first tilts the front feed carriage 12 backward on its pivot rod 13 whereby to expose the said platen for easy paper insertion. A suitable stop arm 19 (FIG. 3) fast to the hinge rod 13 is limited in its movement by the fixed frame 5 of carriage 1 and serves to hold the front feed carriage in the tilted position illustrated in FIG. 2. Following an insertion of a journal sheet the carriage 12 is now manually rocked to its forward position, shown in FIG. 6, and a ledger sheet or other form may thereafter be inserted within a suitable guide chute 20 (FIG. 1) thereof and subsequently automatically brought to a printing line position, in the well-known manner fully described in the above patents of reference.

In order to cushion the carriage 12 against violent manual rocking operations special means have been provided, as will now be described.

Figure 8:
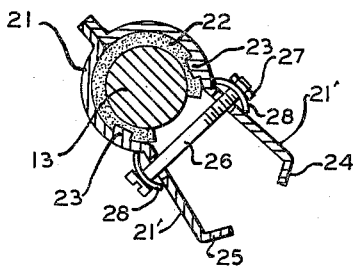
FIG. 8 is a detail sectional elevation of the combination friction control and interlock device.

With particular reference to FIGS. 1 and 8, there is supported at any convenient position upon the hinge rod 13 a clamp plate 21 having a leather or similar piece of friction padding 22 interposed between said plate and the hinge rod 13. A pair of suitable tongues 23 of clamp 21 engage with related grooves of the friction padding whereby to prevent any rotation of said padding in relation to said clamp. Depended from clamp 21 is a pair of arms 21' each one of which at the distal end thereof is bent inwardly to form opposed spaced ledges 24, 25 respectively. A threaded tie bolt 26 extends through suitable enlarged orifices in arms 21' and by means of a threaded nut 27 thereon serves to provide for adjusting the pressure of the friction pad 22 about hinge rod 13. Suitably cupped spring tempered washers 28 are inserted on each end of the bolt 25 whereby to maintain any pressure adjustment and to compensate for wear upon the friction pad 22 in the rocking operations of carriage 12.

It will be obvious therefore that in any rocking operation of carriage 12 the hinge rod 13 will first adjust the cushion clamp means 21 freely until either ledge 24 or 25 is stopped by means of frame 5 and that thereafter the corresponding terminal movement of the carriage will be cushioned through the frictional engagement of hinge rod 13 with the friction pad 22. Thus the carriage is freely brought under momentum before any friction action is brought into play and assures an over-center movement thereof, so that the carriage under its own weight may complete any tilting operation lightly initiated by an operator.

Figure 5:
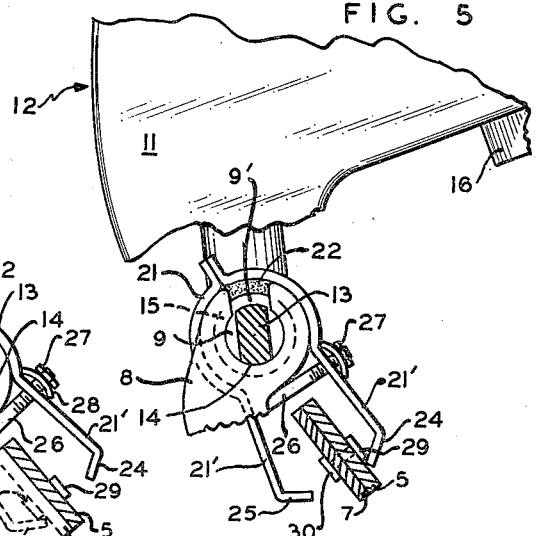
FIG. 5 is a similar view but with the carriage moved forwardly to a partial return position, and showing the cushion lock means in a locked condition while the carriage hinge means is in open condition.

As earlier set forth the front feed carriage 12 is adapted to be readily removed from the machine proper, so that the instant machine may be used for other purposes and the carriage be available for use on other machines. Heretofore in order to remove the carriage an operator had merely to tilt the carriage from its normal forward position illustrated in FIG. 6 to the position as illustrated in FIG. 5, whereby to bring the flattened bearing portions of hinge rod 13 into parallel alignment with the walls of the corresponding slotted openings 9' of the support arms 8, and thereafter to lift the carriage so as to disengage the hinge elements. In the instant case, however, the drag as effected upon hinge rod 13 by the above-described friction cushion means in any violent manual tilting operations of the carriage tends to cause the carraige to be inadvertently lifted by the operator as the bearing surface 14 moves adjacent the slotted opening 9', so that the hinge elements become disengaged and the carriage is very apt to fall free of the machine and be damaged unless other means are provided.

To obviate this condition there is secured within the fixed frame 5 of the shiftable carriage 1 a stud having an enlarged head portion 29 projecting from one side of said frame and a corresponding washer 30 spun fast upon the other end of said stud to project beyond the opposite side of the frame 5. As earlier set forth the arms 21' of the friction cushion means include inwardly bent ledge portions 24, 25 respectively and it is recalled that said ledges are in a spaced-apart relationship.

Figure 4:
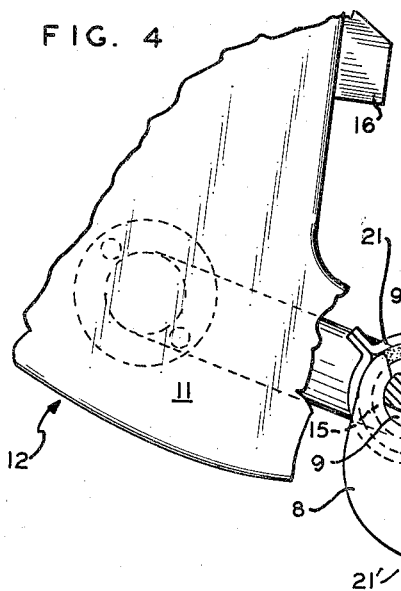
FIG. 4 is a vertical transverse section taken on line 4—4 of FIG. 1, and showing the carriage support hinge and the cushion control lock means both in a locking control position, with the carriage in tilted-back position.
Figure 6:
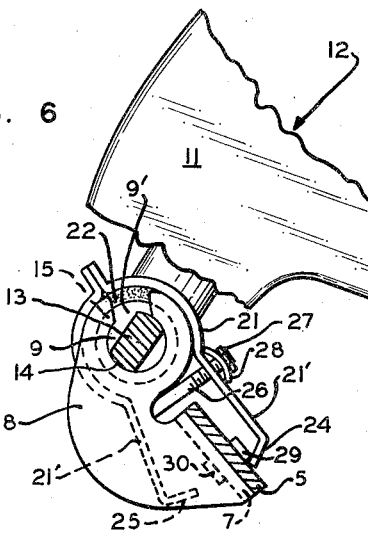
FIG. 6 is a similar view but with the carriage now fully returned to normal forward position for paper insertion, and showing both the carriage hinge rod and the control lock in their locking conditions.

As shown in FIG. 6, with the carriage 12 in its normal forward position the bearing portion 14 of hinge rod 13 is in a forward locked position relative to the notched opening 9' of the related arm 8. At the same time ledge 24 of the friction cushion means is positioned against the forward surface of frame 5 and beneath the stud head 29. During a backward tilting operation of carriage 12 and consequent counterclockwise movement of hinge rod 13 the friction cushion means 21 will be rocked counterclockwise therewith. Thus ledge 24 is carried free of engagement with the stud head 29 while the ledge 25 is subsequently moved yieldably into engagement with the stud washer 30, as shown in FIG. 4. As the backward tilting operation of the carriage is continued the bearing surface 14 is thereafter brought into a complete register with the notched opening of the hinge arm 8. However, at this time ledge 25 being now in engagement with washer 30 will lock the hinge rod 13 within the hinge arms 8 and thus prevent any accidental removal of the carriage.

During a return operation of hinge rod 13 the friction cushion means is rocked clockwise therewith and ledge 25 is moved free of washer 30 while ledge 24 is subsequently brought into locking engagement beneath the stud head 29, as shown in FIG. 5. Thereafter as the carriage is continued in a forward return operation the bearing surface 14 is moved free of its locking action within the support arms 8 and into full register with the slotted opening 9', as viewed in FIG. 5. At this time ledge 24 however, in engaging stud 29, will prevent the carriage 12 from being accidentally lifted free of its hinge support.

Figure 7:
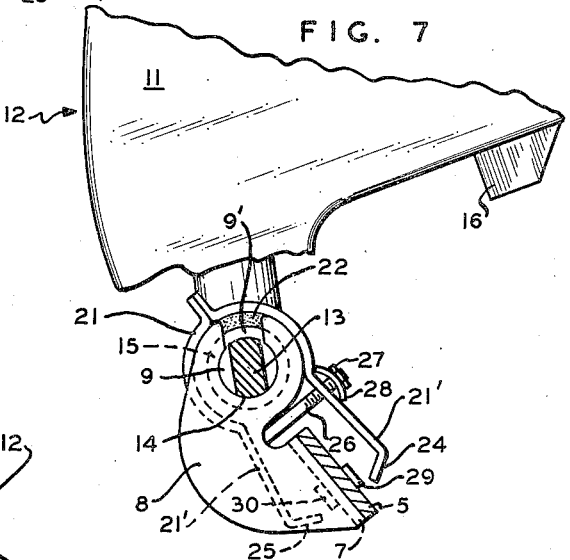
FIG. 7 is a similar view but showing both the carriage hinge rod and the cushion control lock in an unlocked condition as would occur following a selected limited reciprocatory tilting adjustment of the carriage.

To separate the hinge rod 13 from the hinge arms 8 for readily removing the carriage 12 an operator will now first tilt the carriage backward a sufficient movement so that the hinge rod 13 is rotated counterclockwise a slight movement further than the limited counterclockwise movement of the cushion stop ledge 25 as permitted by the stop frame 5 (FIG. 4), earlier described. Thereafter a slight forward or clockwise movement of the carriage will rotate the hinge rod 13 together with the friction cushion means 21, so that the flattened portions of said rod are now brought into alignment with the slotted openings 9' coincident with a centralizing of the ledges 24, 25 free of engagement with both stud 29 and washer 30, as shown in FIG. 7. The carriage is now free to be lifted bodily from the machine proper. In like manner, to replace the carriage the hinge rod 13 is entered within stots 9', and should an interference be encountered the carriage is now given a slight rocking movement, whereby to centralize the ledges 24, 25 free of either holding element 29 or 20.

While there has been shown a preferred embodiment of the invention, it will be understood that various changes may be made in the form, detail, arrangement, and proportions of the parts without departing from the spirit and scope of the invention. Thus, although the instant disclosure shows the invention as embodied in a front feed carriage of the type disclosed in the patents of reference herein, the broader principles of the invention are equally applicable to many different types of work sheet handling mechanisms for printing machines. Accordingly, it is intended that the foregoing disclosure be illustrative only and not limitative of the following claims.

I claim:

1. The combination with a manually tiltable record holder having a hinge rod rotatable therewith upon a cooperating support bearing, said support bearing including an open end slot for receiving said hinge rod in mounting and demounting said record holder with respect to the support bearing, and rotative operation of the record holder rotating the hinge rod into locking engagement with said support bearing; of auxiliary locking devices for said hinge rod including a stationary lock member, a lock member movable into locking engagement therewith upon rotation of the hinge rod in one direction, and a lock member movable into locking engagement therewith upon a rotation of the hinge rod in the opposite direction, and means yieldably movable with said hinge rod in a tilting operation of the record holder, said means being adapted to release an active one of said movable lock members and thereafter to engage an inactive one of said lock members with the said stationary lock member during rotative movements of the hinge rod toward its unlocking position with respect to the said support bearing.

2. In a business machine for printing upon work sheets, the combination with a work support carriage, and means for mounting said carriage for tilting movements upon said machine including a pivot hinge rod and fixed supporting bearings therefor, said bearings including an open end slot for cooperation with said hinge rod in mounting and demounting said carriage relative to the machine, and rotation of the carriage with said hinge rod in either direction from the mounting position locking the hinge rod within said bearing supports; of auxiliary locking means for said hinge rod including a fixed locking member, a first locking element movable into locking engagement therewith in a rotative movement of the carriage in either direction, a second locking element movable into locking engagement with said fixed member in a subsequent tilting operation of the carriage in an opposite direction to the first selected rotation thereof, and means on said hinge rod for moving the auxiliary locking means during said tilting operation of the carriage whereby to displace said first locking element free of said locking member and subsequently to bring the said second locking element into locking engagement therewith prior to an unlocking position movement of the hinge rod with respect to the said supporting bearings therefor.

3. In a business machine for printing upon work sheets, the combination with a work support carriage, and means for mounting said carriage for manual tilting operations upon said machine including a pivot hinge rod and cooperating supporting bearings therefor, and said bearings including an open end slot for receiving said hinge rod in manually mounting the carriage thereon, and rotation of the hinge rod with the carriage locking the related hinge parts together; of a first auxiliary locking means for said carriage including means in frictional engagement with said hinge rod for yieldable displacement therewith and adapted to render said locking means effective, and a second auxiliary locking means for said carriage and being inactive when the first said auxiliary locking means is in active condition, whereby rotation of the hinge rod in a subsequent tilting operation of the carriage will disable the active said first auxiliary locking means and thereafter will enable the said second auxiliary locking means, and whereby the said hinge rod during any continued movement thereof past the open end receiving slot position of cooperation with the supporting bearings will remain locked thereto and the carriage thereby be maintained in a locked-on condition throughout a tilting operation thereof.

4. In a business machine for printing upon work sheets, the combination with a work support carriage, a pivot hinge rod thereon for permitting manual tilting operations of said carriage, and pivot support means for said hinge rod having an open end slot providing unlocked relation therewith whereby to mount and demount said carriage relative to the machine, rotation of the carriage rocking the hinge rod therewith for locking engagement with its pivot support means; of auxiliary locking devices for said carriage adapted for preventing inadvertent demounting of said carriage during subsequent manual tilting operations thereof to alternative set positions, and including a clamp mounted upon said hinge rod for a yieldable frictional movement therewith, opposed spaced arms depending from said clamp, a lock member on each one of said arms for displacement therewith, and a fixed stop member interposed between said arms and having lock members thereon for selective engagement by a related selected one of the displaceable lock members in a first positioning rotation of said carriage, said hinge rod in a subsequent tilting operation of the work support carriage rotating through the said unlocked relation with its pivot support, and prior thereto during said tilting operation said clamp being frictionally moved into engagement with the said fixed stop so as to unlock any active selected one of said displaceable lock members and engage an other one of said displaceable lock members whereby to maintain the carriage in a locked-on condition during said tilting operations.

5. The combination with a manually tiltable record holder having a hinge rod rotatable therewith about a cooperating fixed bearing support therefor; of means for cushioning manual tilting operations of said record holder including a clamp mounted upon said hinge rod for yieldable frictional engagement therewith, a pair of opposed spaced-apart arms depending from said clamp, and a fixed stop member interposed between the said arms, whereby during an initial movement of said hinge rod in a tilting operation of the record holder said clamp will move freely therewith for subsequent engagement with said stop member, and whereby said clamp in the continued operation of said hinge rod is held arrested by said stop member and thereby effects a frictional resistance to said continued operation of said hinge rod whereby to cushion the manual tilting operations of said record holder.

6. The invention according to claim 5 and having a friction pad spaced between said clamp and said hinge rod and including means on said clamp cooperable with means on said friction pad whereby to prevent relative rotation between the said clamp and said friction pad.

7. The invention according to claim 6 and having regulating means for said arms whereby to adjust the frictional pressure applied to said hinge rod and including compression means mounted upon said regulating means whereby to maintain such adjustment against a wearing of said friction pad.

8. The combination with a record holder adapted for manual tilting operations upon a hinge rod supported within open end slot bearing means; of combined friction cushion stop and locking means including a clamp mounted upon said hinge rod in yieldable frictional engagement therewith, said clamp including a pair of opposed spaced-apart arms each arm terminating in a locking ledge at the distal end thereof, fixed stop means interposed between said arms and permitting a limited free movement of said friction cushion stop means during initial tilting operations of the record holder and thereafter to cushion a further movement thereof, and lock elements on opposite sides of said fixed stop and adapted for engagement by a related one of said locking ledges according to the direction of movement of the record holder, whereby upon subsequent manual tilting operations of the record holder said clamp during said limited free movement thereof displaces any active one of said locking ledges free of the fixed lock elements and will engage an inactive one of said locking ledges therewith so that the hinge rod will be locked within said open end bearing means throughout the tilting operations of the record holder.

9. In a business machine for printing upon work sheets, said machine having a work support and means for mounting said work support for a rocking operation upon said machine including a pivot hinge rod and support members therefor having an open end slot adapted for alignment with related surfaces on the hinge rod to permit mounting and demounting of the work support relative to the machine, rotation of the hinge rod displacing said surfaces into locking engagement with said support members; combination cushion stop and lock means for said work support including friction cushion stop means clamped to said hinge rod for yieldable movement therewith, said stop means including a pair of opposed spaced arms, a stationary stop interposed between said arms for controlling the extent of movement thereof to thereby effect frictional drag upon the hinge rod for cushioning rocking operations of the work support, lock elements on said stationary stop, and lock elements on said arms and displaceable therewith for engagement selectively with related ones of the lock elements on said stationary stop in accordance with selected tilting operations of the work support, said engagement locking the hinge rod to the support members throughout unlocked alignment of the hinge rod with said support members during the said tilting operations.

10. The invention according to claim 9 and wherein the cushion stop arms are adapted for adjustment to an intermediate position in a given reciprocatory movement of the work support, and wherein during said adjustment the lock elements on said arms are displaced to an unlocked condition with respect to their cooperating fixed lock elements, and wherein during said adjustment of the cushion stop arms relative adjustment is effected also between the stop arms and the hinge rod whereby said hinge rod is brought to its unlocked position with respect to the slotted support member concurrently with the said unlocking of said lock elements to thereby permit removal of the work support from the machine.

11. The combination with a record holder rotatable upon supporting means therefor, friction means for cushioning the rotative movement of said record holder including means rotatable with said record holder, means having yieldable frictional engagement with said rotatable means, and a stop member spaced for limiting a movement of the latter said means following a first portion of a movement of the said rotatable means by rotation of the said record holder, said friction means moving freely with the record holder until subsequent engagement thereof with the said stop member and upon continued rotation of the record holder being held arrested by said stop member to cause frictional resistance to such continued operation and thereby cushion a terminal portion of the rotative movement of said record holder.

12. The invention according to claim 11 and including locking elements on said stop member cooperable with locking elements on the friction cushion means and adapted upon engagement of said cushion means with the said stop member to lock the carriage upon its supporting means.

References Cited in the file of this patent

UNITED STATES PATENTS

| | | |
|---|---|---|
| 2,766,867 | Salzberger | Oct. 16, 1956 |
| 2,843,246 | Maurer | July 15, 1958 |